(12) United States Patent
Wilson

(10) Patent No.: US 10,812,903 B2
(45) Date of Patent: Oct. 20, 2020

(54) REMOTE DEVICE CONFIGURED AS AUTOMATIC CONTROLLER FOR AUDIO DEVICE

(71) Applicant: David Wilson, Lafayette, LA (US)

(72) Inventor: David Wilson, Lafayette, LA (US)

( * ) Notice: Subject to any disclaimer, the term of this patent is extended or adjusted under 35 U.S.C. 154(b) by 0 days.

(21) Appl. No.: 15/888,043

(22) Filed: Feb. 4, 2018

(65) Prior Publication Data

US 2020/0068303 A1    Feb. 27, 2020

Related U.S. Application Data

(60) Provisional application No. 62/455,003, filed on Feb. 6, 2017.

(51) Int. Cl.
*H03G 3/00* (2006.01)
*H04R 3/04* (2006.01)
*G06F 3/16* (2006.01)

(52) U.S. Cl.
CPC ............. *H04R 3/04* (2013.01); *G06F 3/165* (2013.01); *H04R 2420/07* (2013.01); *H04R 2430/01* (2013.01)

(58) Field of Classification Search
CPC .. H04R 2430/01; H04R 2420/07; H04R 3/04; G06F 3/165
USPC .................................................. 381/104–107
See application file for complete search history.

(56) References Cited

U.S. PATENT DOCUMENTS

2011/0051016 A1\*    3/2011    Malode .................... H03G 1/02
348/734

\* cited by examiner

*Primary Examiner* — Ammar T Hamid
(74) *Attorney, Agent, or Firm* — IPR Law Group PC

(57) ABSTRACT

A remote device includes or is configured as an automatic remote control system or device that detects at the remote device in an environment a sound level of audio output from a device. A desired sound level is identified from the detected sound level. The remote device dynamically detects in the environment a current sound level of the audio output. The detecting of the current sound level occurs subsequent to the identifying the desired sound level. The remote device compares the current sound level to the desired sound level, and generates a volume control signal in response to a result of the comparing. The remote device automatically controls, using the volume control signal, a volume of the device to continually maintain at the desired sound level the current sound level detected in the environment.

2 Claims, 2 Drawing Sheets

REMOTE DEVICE CONFIGURED AS AUTOMATIC CONTROLLER FOR AUDIO DEVICE

RELATED APPLICATION

This application claims the benefit of United States (US) Patent Application No. 62/455,003, filed Feb. 6, 2017.

TECHNICAL FIELD

The embodiments described herein relate to applications running on a processor and, more particularly, an application for providing functionality on a smart phone, tablet, or other portable computing device.

BACKGROUND

Automatic audio or volume control technology is desired for use with various types of electronic equipment, when there is a desire to adjust the volume of sound-emitting devices or equipment based on the noise levels in the immediate surrounding environment or area. There is a need for an automatic volume control device and method that effectively controls or adjusts the volume of a sound-emitting device based on an ambient noise level in the vicinity of the listener. There is also a need for an automatic volume control device and method configured for use with an existing sound-emitting device configured to receive a remote signal.

INCORPORATION BY REFERENCE

Figure 1:
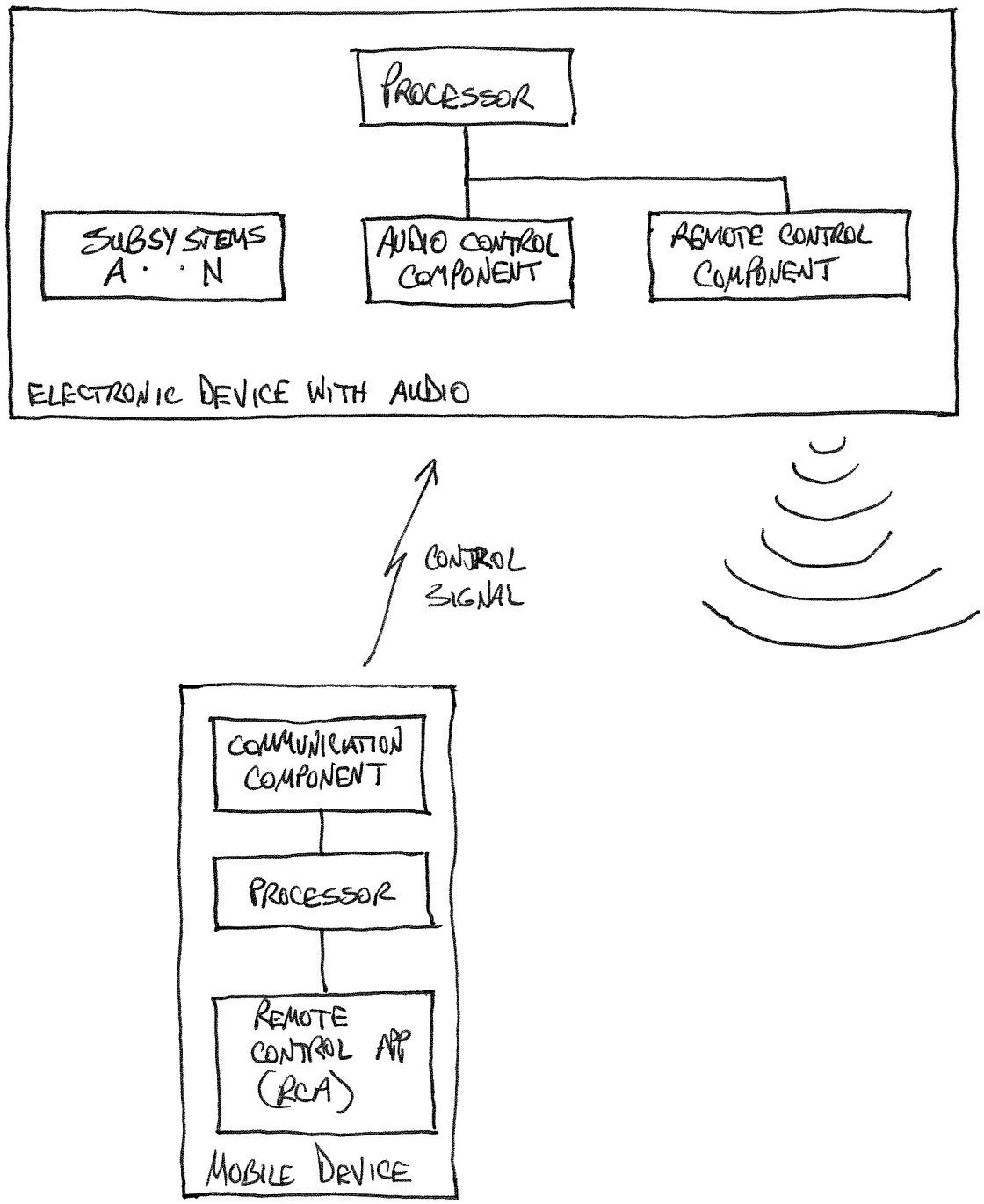
FIG. 1 is a block diagram of a system including the mobile device remote control (MDRC), under an embodiment.

Each patent, patent application, and/or publication mentioned in this specification is herein incorporated by reference in its entirety to the same extent as if each individual patent, patent application, and/or publication was specifically and individually indicated to be incorporated by reference.

DETAILED DESCRIPTION

Embodiments comprise a mobile device including or configured as an automatic remote control device that detects a desired level or volume of audio output of a sound-emitting device that is remote to the mobile device, and automatically controls the audio output volume at approximately the desired level. The mobile device when so configured detects a desired level or volume of the audio output of the sound-emitting device (e.g., televisions, audio equipment, computer equipment, gaming equipment, voice-commanded devices, etc.) in an environment. In response to the detected audio output volume, the mobile device automatically generates and transmits control signals configured to control the audio output volume of the electronic device at approximately the desired level, thereby compensating for ambient, environmental noise changes and sudden changes in program material volume.

The mobile device is configured to include or host a remote control application (app) ("RCA"). Execution of the RCA on a processor of the mobile device configures the mobile device to automatically detect and control the audio output of the electronic device at the desired level. In so doing the RCA is configured to couple to and/or use other components of the mobile device (e.g., microphone, communication component, application or algorithm, camera, circuitry, etc.) but is not so limited. Consequently, the mobile device running the RCA, referred to herein as the "mobile device remote control" ("MDRC"), becomes a remote control device configured to control existing audio/video device(s) configured to respond to remote control inputs.

In the following description, numerous specific details are introduced to provide a thorough understanding of, and enabling description for, the systems and methods described. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Generally, in an embodiment, the MDRC comprises a processor of a mobile or smart device running the RCA, which is configured to use at least one microphone (e.g., directional, omnidirectional, etc.) of the host mobile device for detecting a sound level emitted from a sound-emitting device. The mobile device includes one or more of smart phones, tablet computers, smart watches, and wearable computing devices, but is not so limited. The RCA (e.g., iOS, Android, etc.) is downloadable to the mobile device from a remote server (e.g., app store, etc.), for example, and is configured to communicate with the sound-emitting device or components of the sound-emitting device via one or more communication couplings or channels (e.g., radio frequency (RF), Bluetooth, WiFi, infrared (IR), cellular, broadband, etc.). This configuration enables the MDRC to continuously or nearly-continuously control the audio output of the sound-emitting device.

The RCA is configured to use data or information of the received sound level (desired as set or indicated) and the total received noise level to calculate a reference sound-to-noise ratio. A timed sampling cycle or loop periodically measures the sound level and the total received noise level so as to calculate a current sound-to-noise ratio and to determine whether the sound-to-noise ratio has changed. If the current measurements indicate the sound-to-noise ratio has changed, then the RCA generates and controls transmission of the appropriate signal to the sound-emitting device to adjust the sound level so that the desired sound-to-noise ratio is maintained. Hysteresis, in which the RCA determines whether a pre-determined amount of time has passed since the device last adjusted the sound level, is used in an embodiment to prevent continuous fluctuations of the sound.

The MDRC includes a system and methods for automatically detecting and controlling or adjusting the audio output level emitted from a sound-emitting device based upon changes in the ambient noise level or unintended changes in the audio level emitted by the sound-emitting device. FIG. 1 is a block diagram of a system including the MDRC, under an embodiment. The system includes an electronic device having an audio output. The electronic device, referred to herein as the sound-emitting device, includes a processor coupled to one or more components or systems. The components of the electronic device of an embodiment include an audio component configured to output audio or sound signals. An audio control component controls a volume or sound level of the audio output. A remote control component is configured to receive signals (e.g., wireless signals, wired signals, hybrid signals, etc.) from a remote controller or device configured to control one or more characteristics (e.g., volume, picture quality, channel selection, input source, output source, etc.) of the electronic device and/or attached or coupled systems.

The system includes the MDRC, comprising a mobile device having a processor configured with and running the RCA as described in detail herein. The RCA comprises one or more of a stand-alone application, a component or module of one or more other applications or software programs, and an embedded application or program, for example, but is not so limited. The RCA is hosted on a host device when the RCA is downloaded or otherwise installed on the host device, or when the RCA is a component of another application or program hosted or installed on the host device. The MDRC, in the role of portable remote control device, is configured to control one or more characteristics of the electronic device. The mobile device processor is coupled to a communication component or device of the mobile device, and the RCA is configured to use the communication component for transmission of control signals.

The MDRC is used in an environment in which the sound-emitting device is being used, and is configured to collect and use data or information of ambient noise in the environment and/or audio output of the sound-emitting device to adjust and control at a desired level the audio output level of sound-emitting device. Ambient noise as used herein refers to noise that exists in and around the environment and vicinity of the person listening to the sound-emitting device. This could include any noise present in the environment (e.g., human voices, other sound-emitting devices, environmental control system noise, machine noise, etc.). When the audio output of the sound-emitting device changes significantly and/or ambient noise level fluctuates, the person listening to the sound-emitting device may no longer find the audio output at a comfortable level. More specifically, if audio output of the sound-emitting device increases significantly and/or if ambient noise level decreases, the listener may find the output to be uncomfortably loud and may desire to lower the audio output level to a more comfortable level. Conversely, if audio output of the sound-emitting device decreases significantly and/or if ambient noise level increases, the listener may find the output to difficult to hear and may desire to raise the audio output level to a more comfortable level.

The sound-emitting device can be any electronic device having audio output, and is configured to respond to a remote input signal as a means for adjusting the level of that audio output. For example, the sound-emitting device includes but is not limited to one or more of a television, audio equipment, sound system, computer equipment, gaming console or equipment, voice-commanded device, and any device which has an adjustable volume control, to name a few. The sound-emitting device comprises remote signal circuitry configured to receive the control signal from the MDRC. The remote signal includes an instruction or control signal sent by the MDRC to control (e.g., increase, decrease, etc.) the audio output level, but is not so limited. The control signal generated and transmitted by the MDRC of an embodiment includes a signal configured for communication or compatible with the remote signal circuitry of the sound-emitting device. For example, the control signal includes at least one of a radio frequency (RF) signal, Bluetooth signal, WiFi signal, infrared (IR) signal, and cellular signal, but is not so limited.

The MDRC is an autonomous remote control device that is portable. When operating to detect sound levels in the environment, the RCA of the MDRC accesses the microphone(s) of the MDRC in order to receive and/or sample data or information of the ambient sound level in a vicinity of the MDRC and the sound-emitting device. The MDRC microphone(s) receive information of the total noise level in the environment, including the combination of audio output or emitted sound level and ambient noise level. Thus, total noise level detected at the MDRC represents the aggregate of all sounds in the environment (heard by the user), and is not limited to the audio output of the emitting device.

The RCA is configured to sample or convert the analog sound data received via the microphone(s), and generate digital data representing the analog sound data received via the microphone(s). Alternatively, the RCA controls or uses one or more components of the host mobile device to perform the sampling or analog-to-digital conversion operation. The RCA is configured to analyze the received sound data and determine from the analysis a reference sound-to-noise ratio using one or more processing routines known in the art. In an embodiment, the RCA analysis of the received sound data is configured to identify signature data of one or more of the audio output and the ambient noise level using one or more processing routines known in the art. The reference sound-to-noise ratio represents the desired listening volume level, relative to the ambient noise level, set or established at the sound-emitting device by the user.

Upon determining the reference sound-to-noise ratio, the RCA is configured to periodically sample the ambient noise level and calculate the sound-to-noise ratio. If the sound-to-noise ratio has changed since the last or most recent determination of the sound-to-noise ratio, then either audio output level has changed without a equivalent change in ambient noise level (e.g., a commercial advertisement comes on with a louder volume than the program in which it is played), or ambient noise level has changed without an equivalent change in audio output level. In either case, the RCA generates control signals for use in commanding a change in audio output level at the sound-emitting device in order to return to the reference sound-to-noise ratio.

In commanding a change in audio output level at the sound-emitting device, the RCA automatically controls changes (e.g., volume-up, volume-down, etc.) of the audio output level using control signals generated in response to detected sound levels. In response to each sampling of the ambient noise, the RCA is configured to perform a comparative analysis of the current sampled ambient noise level and the reference sound-to-noise ratio. Based on results of this comparative analysis, the RCA is configured to generate an appropriate control signal (e.g., volume-up control signal, volume-down control signal) configured to control the sound-emitting device volume to maintain the reference sound-to-noise ratio. The control signal is configured as a volume change control or command and, in an embodiment, is generated using signal protocol data corresponding to a signal receiver specification of the sound-emitting device. The RCA of an embodiment at least one of includes the signal protocol data as a component of the RCA, separately downloads the protocol data from a remote location, device and/or server, and analyzes a control signal to determine the protocol. The RCA accesses a communication component of the host mobile device in order to control or otherwise effect transmission of the control signal. The communication component includes at least one of an RF device or transmitter, Bluetooth transmitter, WiFi transmitter, IR transmitter, cellular transmitter, broadband transmitter, and proprietary transmitter, but is not so limited. The transmitted control signal is received the signal receiver of the sound-emitting device.

In an embodiment, the RCA is configured to generate and display a user interface (UI) via a display device of the host mobile device. The UI includes volume control icons configured to receive user volume control inputs, but is not so limited. In response to activation of the volume control icons, the RCA is configured to generate volume control signals as appropriate to the commanded volume change. By activating these interface buttons a user can remotely adjust the volume of the sound-emitting device using the MDRC. The RCA is configured to monitor such user adjustments so that volume-up and volume-down control communicate with the RCA so that, if the user presses a volume control button, the RCA can account for the user preference in its determination of a new emitted sound level.

Figure 2:
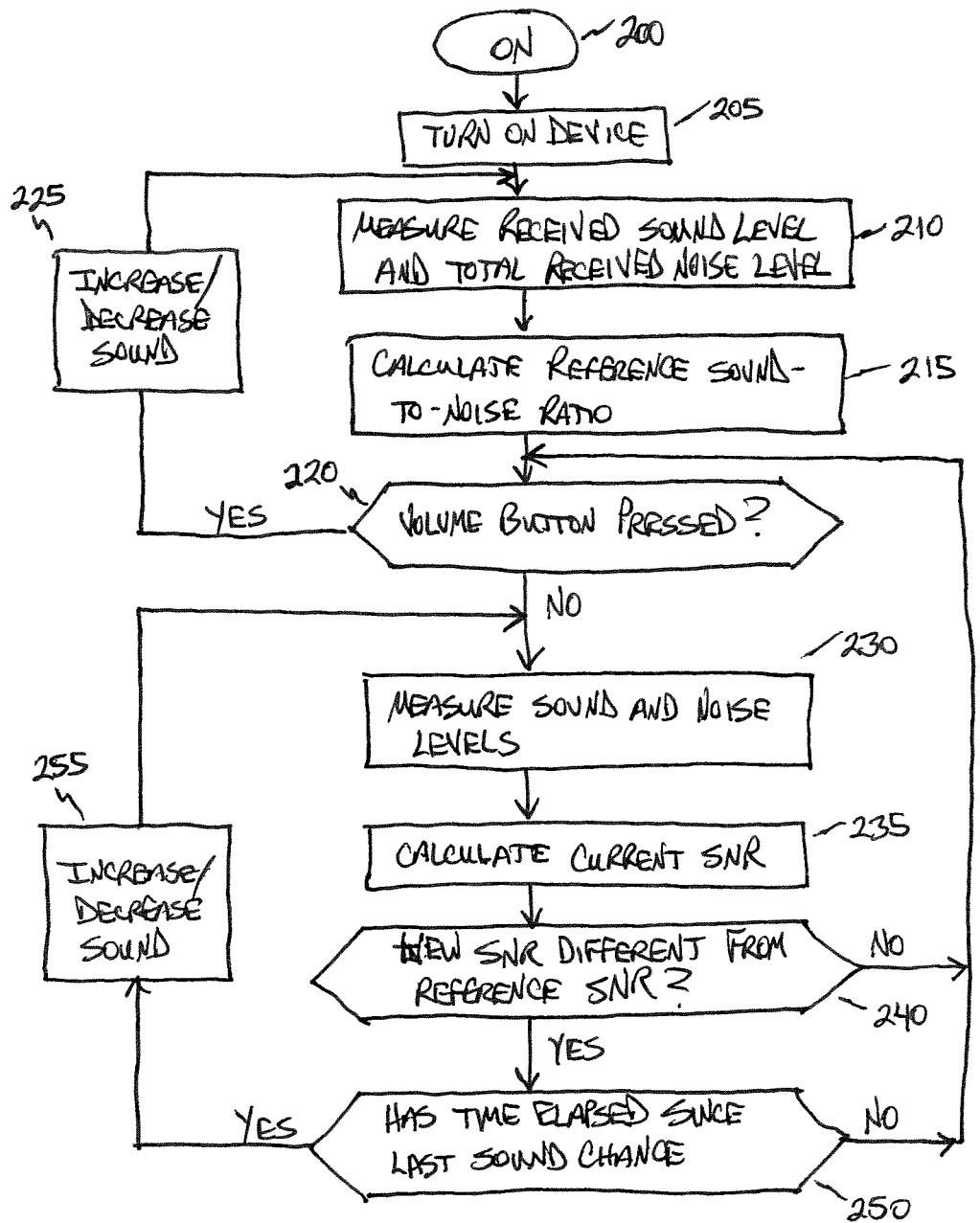
FIG. 2 is a flow diagram for automatic volume control of a sound-emitting device by the MDRC, under an embodiment.

FIG. 2 is a flow diagram for automatic volume control of a sound-emitting device by the MDRC, under an embodiment. The MDRC automatically adjusts audio output level of a sound-emitting device by using a sound-to-noise ratio calculation as described herein, but is not so limited. Operation begins upon activation of the MDRC 100. The sound-emitting device is placed in the operational state 105. Data of received sound level and total received noise level are collected or received 110. The MDRC calculates a reference sound-to-noise ratio 115. As described in detail herein, the sound-to-noise ratio is a ratio in which received sound level is the numerator and the difference between total received noise level and received sound level is the denominator. The difference between total received noise level and received sound level is equivalent to ambient noise level.

The MDRC determines whether the user has activated a volume control (e.g., volume up, volume down) of the sound-emitting device via the MDRC UI and, if so, assumes that the reference sound-to-noise ratio was unsatisfactory to the user 220. If the volume control of the sound-emitting device has been activated or operated, the MDRC indicates either an increase or decrease in emitted sound level 225. Operation of the MDRC returns to re-measure received sound level 210 and total received noise level, and re-calculate a new reference sound-to-noise ratio 215.

Operations of the MDRC, upon determining a volume control button has not been activated, continue with a periodic sampling of the ambient noise level in the local environment and calculation of the sound-to-noise ratio. As such, the MDRC re-measures received sound level and total received noise level 230. The periodic sampling cycle or loop enables the re-measurement of received sound level and total received noise level at a periodic interval, and in so doing prevents volume adjustments within a specified interval since a previous volume adjustment. The periodic interval of an embodiment is configurable but is not so limited. The MDRC calculates the current sound-to-noise ratio 235, as described in detail herein, using the most recent measurements of received sound level and total received noise level.

Operations of the MDRC then determine whether the current calculated sound-to-noise ratio is different from the reference sound-to-noise ratio 240. If no difference is determined between the current sound-to-noise ratio and the reference sound-to-noise ratio, operations return to determine whether the user has activated a volume control 220. A determination of a detected difference between the two sound-to-noise ratios indicates that emitted sound level may need to be adjusted in order to maintain the desired or original sound-to-noise ratio established by the user. As described in detail herein, a detected change in sound-to-noise ratio since the most recent determination of sound-to-noise ratio indicates either a change in emitted sound level, without an equivalent change in ambient noise level (e.g., commercial advertisement with louder volume than the program originally being listened to), or a change in ambient noise level, without an equivalent change in emitted sound level.

When the sound-to-noise ratio has changed, MDRC operations continue to determine whether a given amount of time has elapsed since the last time emitted sound level was changed by the MDRC 250. This determination 250, in effect, provides a hysteresis loop configured to prevent continual fluctuations in emitted sound level. For example, in an embodiment, the MDRC polls for changes in the sound-to-noise ratio once per second. However, it may not be desirable to adjust emitted sound level every second, even if the sound-to-noise ratio was changing often enough so as to ordinarily compel it, since a person listening to the sound-emitting device may find the continual fluctuations of emitted sound level annoying or distracting.

The MDRC of an embodiment is therefore configured to use hysteresis to control timing or frequency of adjustments made to the volume level of the sound-emitting device. Accordingly, the MDRC of an embodiment is configured to generate control signals to adjust the volume 255 to maintain the reference sound-to-noise ratio only after a pre-specified period of time (e.g., 3 seconds, 5 seconds, etc.) has elapsed since the most recent adjustment. When the elapsed time since the most recent adjustment is less than the pre-specified period of time, no control signal is issued and operation continues to determine whether the user has activated a volume control 220. When the elapsed time since the most recent adjustment is equal to or greater than the pre-specified period of time, then a control signal is issued as appropriate to the detected noise level and operation continues to re-measure received sound level and total received noise level 230 following the adjustments 255.

Regarding operations of the MDRC for automatic volume control of a sound-emitting device, additional or alternative operations can be performed to achieve different results. For example, in an alternative embodiment, the MDRC does not generate and issue control signals to increase or decrease audio output level when audio output level is already at a predetermined maximum or minimum threshold level, respectively. In this manner the MDRC prevents the continued increase or decrease of audio output level to a volume that is uncomfortable or undesirable to the user, even when the determination of the ambient noise level indicates such an increase or decrease.

The MDRC of another alternative embodiment uses or includes alternative threshold levels. For example, substantial increases or decreases in ambient noise level result in a corresponding change to detected audio output level. Under these circumstances, the MDRC is configured, instead of determining whether a given amount of time has elapsed since the last adjustment to audio output level, to determine whether the current sound-to-noise ratio has changed by a predetermined amount (e.g., 10%, 15%, etc.). When the MDRC detects the sound-to-noise ratio has changed by at least the predetermined amount, then control signals are generated to command a change of the audio output level as described in detail herein. When the MDRC detects the sound-to-noise ratio has not changed by at least the predetermined amount, then control signals are not generated so that no change is commanded to the audio output level.

Similarly, the thresholds used by the MDRC of an embodiment for determining whether to command a change in the audio output are set depending on one or more different criteria. These criteria include, but are not limited to, whether the audio output level is greater or less than a threshold amount, whether the difference between a sound-to-noise ratio and the current sound-to-noise ratio is greater or less than a specified amount, and whether total received noise level is greater than or less than a threshold amount.

The MDRC of yet another alternative embodiment is configured to control (e.g., increase, decrease) audio output level of the sound-emitting device in an inverse relation with ambient noise level of the local environment. For example, a user receiving a telephone call may wish to turn down the volume of the television while taking the call. The voice energy of the one participating in the call adds to the ambient noise level and consequently to the total received noise level. Under embodiments described herein, the MDRC would increase audio output level to compensate for the sound of the talking by sending the appropriate control signal to the sound-emitting device. In this alternative configuration, however, the MDRC instead decreases audio output level, thereby enabling uninterrupted participation in the telephone call.

Embodiments of the RCA described herein include it being hosted on a mobile device and configuring the mobile device as the MDRC. The RCA of alternative embodiments, however, is configured for hosting in other electronic devices. For example, the RCA of an alternative embodiment is a component of or included in the sound-emitting device (e.g., televisions, audio equipment, computer equipment, gaming equipment, voice-commanded devices, etc.) so that the audio output level of the sound-emitting device is self-controlling as to the local environment. The RCA of another alternative embodiment is a component of or included in a remote control or controller of one or more electronic devices in the local environment. In yet another alternative embodiment, the RCA is a component of or included in a home automation hub or controller and/or an Internet of Things (IOT) controller. In still another alternative embodiment, the RCA is a component of or included in a virtual assistant device (e.g., Amazon Echo/Alexa, Google Home/Assistant, Microsoft Cortana, etc.).

The RCA of other alternative embodiments is configured for hosting in a dedicated electronic device configured for placement in the local environment adjacent the sound-emitting device. This embodiment includes the use of a small electronic device referred to as a "dedicated controller" and comprising a processor coupled to the RCA, and at least one microphone configured to detect sound or noise in the local environment. The dedicated controller also includes a communication component configured to output or transmit control signals to the sound-emitting device. The dedicated controller components operate in accordance with the operations of the MDRC described in detail herein.

Embodiments include a system comprising a remote device configured to receive in an environment audio output of a device. The system includes an application executing on the remote device and configured to detect in the environment a sound level of the audio output. The application is configured to identify a desired sound level from the detected sound level. The application is configured to dynamically detect in the environment a current sound level of the audio output. The detecting of the current sound level occurs subsequent to the identifying the desired sound level. The application is configured to compare the current sound level to the desired sound level. The application is configured to generate a volume control signal in response to a result of the comparing, and automatically control, using the volume control signal, a volume of the device to continually maintain at the desired sound level the current sound level detected in the environment.

Embodiments include a system comprising: a remote device configured to receive in an environment audio output of a device; and an application executing on the remote device and configured to: detect in the environment a sound level of the audio output; identify a desired sound level from the detected sound level; dynamically detect in the environment a current sound level of the audio output, wherein the detecting of the current sound level occurs subsequent to the identifying the desired sound level; compare the current sound level to the desired sound level; generate a volume control signal in response to a result of the comparing; and automatically control, using the volume control signal, a volume of the device to continually maintain at the desired sound level the current sound level detected in the environment.

Embodiments include a method comprising detecting at a remote device in an environment a sound level of audio output from a device. The method identifies a desired sound level from the detected sound level. The method dynamically detects at the remote device in the environment a current sound level of the audio output. The detecting of the current sound level occurs subsequent to the identifying the desired sound level. The method compares the current sound level to the desired sound level. The method generates a volume control signal in response to a result of the comparing. The method automatically controls, using the volume control signal, a volume of the device to continually maintain at the desired sound level the current sound level detected in the environment.

Embodiments include a method comprising: detecting at a remote device in an environment a sound level of audio output from a device; identifying a desired sound level from the detected sound level; dynamically detecting at the remote device in the environment a current sound level of the audio output, wherein the detecting of the current sound level occurs subsequent to the identifying the desired sound level; comparing the current sound level to the desired sound level; generating a volume control signal in response to a result of the comparing; and automatically controlling, using the volume control signal, a volume of the device to continually maintain at the desired sound level the current sound level detected in the environment.

The components described herein can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory (such as electronically erasable programmable read only memory (EEPROM)), embedded microprocessors, firmware, software, etc. Furthermore, aspects of the systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, HTTPs, FTP, SMTP, WAP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the systems and methods is not intended to be exhaustive or to limit the systems and methods to the precise forms disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

The elements and acts of the various embodiments described above can be combined to provide further embodiments. These and other changes can be made to the systems and methods in light of the above detailed description.

What is claimed is:

1. A system comprising:
   a remote device configured to receive in an environment audio output of a device;
   an application executing on the remote device and configured to:
      detect in the environment a sound level of the audio output;
      identify a desired sound level from the detected sound level;
      dynamically detect in the environment a current sound level of the audio output, wherein the detecting of the current sound level occurs subsequent to the identifying the desired sound level;
      compare the current sound level to the desired sound level;
      generate a volume control signal in response to a result of the comparing;
      automatically control, using the volume control signal, a volume of the device to continually maintain at the desired sound level the current sound level detected in the environment; and
      in response to detecting a user-activated volume change of the audio output, identify an adjusted current sound level and automatically control the volume of the device to continually maintain at the desired sound level the adjusted current sound level.

2. A method comprising:
   detecting at a remote device in an environment a sound level of audio output from a device;
   identifying a desired sound level from the detected sound level;
   dynamically detecting at the remote device in the environment a current sound level of the audio output, wherein the detecting of the current sound level occurs subsequent to the identifying the desired sound level;
   comparing the current sound level to the desired sound level;
   generating a volume control signal in response to a result of the comparing;
   automatically controlling, using the volume control signal, a volume of the device to continually maintain at the desired sound level the current sound level detected in the environment; and
   in response to detecting a user-activated volume change of the audio output, identify an adjusted current sound level and automatically control the volume of the device to continually maintain at the desired sound level the adjusted current sound level.

* * * * *